Patented July 16, 1929.

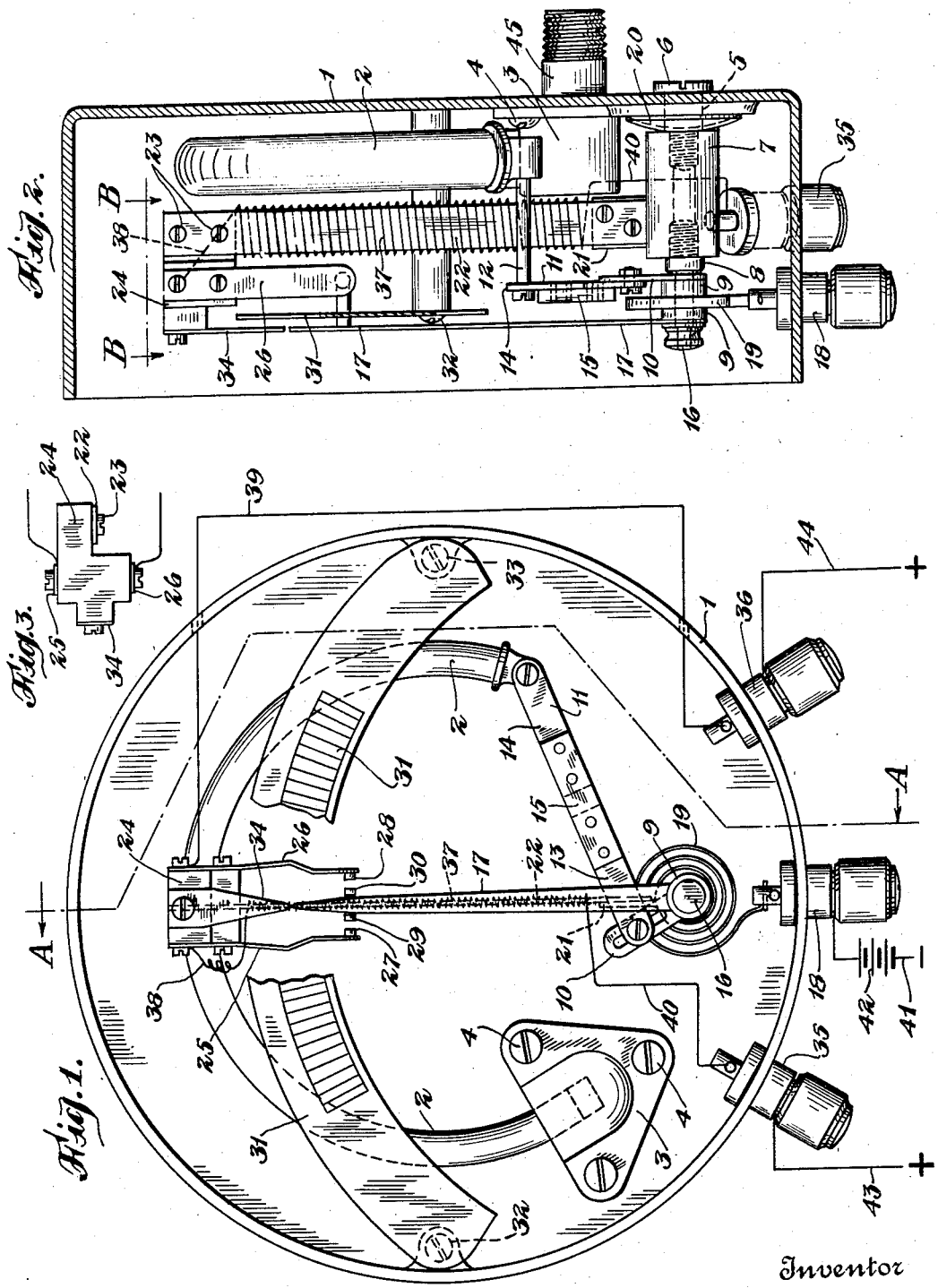

1,720,901

UNITED STATES PATENT OFFICE.

EMIL A. ILEMAN, OF NEW YORK, N. Y., ASSIGNOR, BY MESNE ASSIGNMENTS, TO CONSOLIDATED ASHCROFT HANCOCK COMPANY, INC., OF NEW YORK, N. Y., A CORPORATION OF DELAWARE.

REGULATING APPARATUS.

Application filed September 18, 1926. Serial No. 136,364.

My invention relates to improvements in regulating apparatus and more particularly to apparatus adapted to maintain substantially constant pressure, temperature or other conditions at a given place.

The main object of the invention is to provide an apparatus which is more reliable in its operation and particularly to provide an apparatus which will maintain pressure, temperature or other condition more nearly constant under certain conditions. Further and more specific objects, features and advantages will more clearly appear from the detailed description given below taken in connection with the accompanying drawings, which form a part of this specification.

In the drawings, Fig. 1 is a face view of an apparatus embodying my improvements in a preferred form thereof, the glass cover being omitted, the wiring connections being shown diagrammatically and the scale being broken away in order to more clearly illustrate the same; Fig. 2 is a section taken substantially on the line A—A of Fig 1; and Fig. 3 is a top plan view of the contact head taken on the line B—B of Fig. 2.

In order to make the operation of the device clear to those skilled in the art, I will describe the same in connection with a motor operated valve adapted to control, for instance, the admission of steam under pressure to a retort in which it is desired to maintain the pressure substantially constant. Indeed I prefer to use the invention with an electrically operated valve such as shown and described in my co-pending application Ser. No. 136,365, filed Sept. 18, 1926. However, as above stated, the improvements may be used with other forms of valves and to maintain other conditions for a wide variety of purposes.

Referring to the drawings 1 represents a suitable casing and 2 represents a hollow spring tube, such as is known as a Bourdon tube, one end of which is rigidly fixed to the head 3, which in turn is secured to the inside of the casing by screws 4. Connection is made from the retort to the tube 2 through the pipe nipple 45 and head 3 so that variations in pressure in the retort are also exerted in the tube 2. Journalled in the back of the casing is a stud 5 having a head 6 adapted to be engaged by a screwdriver so that the stud may be readily turned to make certain adjustments as hereafter described. Tightly screwed on to the inner end of the stud 5 is a body of insulating material 7, and screwed into the opposite end of the insulating body 7 is a stud bearing member 8. Journalled on the bearing member 8 and adapted to freely rotate with respect thereto is a hub 9 to which is rigidly attached a slotted arm 10. Adjustably and pivotally attached to the arm 10 is one end of a link 11, the other end of which is pivotally attached to the free end of the spring tube 2 by means of post 12. The link 11 is composed of two parts 13 and 14 connected by a piece of insulating material 15 so that the parts 8, 9 and 10 are all insulated from the casing and other parts which may be grounded. A pointer switch member 17 is also rigidly secured to the insulated hub 9 and a cap screw 16 holds the hub 9 in place on the stud 8. The switch member 17 and hub 9 are electrically connected to a binding post 18 by a metal hair-spring 19, one end of which is fixedly connected to the hub 9 and the other end of which is suitably secured to the binding post, the spring 19 being coiled about the hub 9 so that it offers substantially no resistance to the rotation of the hub 9. 20 represents a spring washer between the insulating body 7 and casing 2 and adapted to frictionally hold the body 7 in any of its rotative positions to which it may be adjusted by turning the stud 5.

The insulating member 7 is provided with an integral upwardly extending bracket 21 to which is screwed the lower end of a thermostatic member 22. The thermostatic member 22 comprises two thin layers of dissimilar metals so chosen and secured together that when heated the member as a whole will bend and, if the bottom thereof be maintained stationary, the top end will be moved or displaced in a manner well understood by those skilled in the art. Secured to the top of the member 22 by screws 23 is a block of insulating material 24 to which are attached two spring fingers 25 and 26, carrying electrical contacts 27 and 28 respectively adapted to engage and make electrical contact with the contacts 29 and 30 respectively on the switch arm 17 when the switch arm is moved to one side or the other by the operation of the pressure member 2. 31 represents an arcuate scale secured to the frame at 32 and 33 and over which the pointer switch member 17 may travel. 34 represents a pointer member secured to the front of the insulating block 24 and also arranged to cooperate with the scale 31. 18, 35 and 36 represent three binding posts secured to the casing but insulated with respect thereto in any suitable manner. Arranged about the thermostatic member 22 is coil 37 of insulated electrical conducting wire. The upper end of this coil is connected to the contact 27 through connection 38 and spring finger 25. The contact 28 is connected to binding post 36 through spring finger 26 and connection 39, and the lower end of coil 37 is electrically connected with the binding post 35 through connection 40. 41 represents a connection to the binding post 18 and in which any suitable source of E. M. F. may be connected as indicated at 42. 43 and 44 represent connections to the binding posts 35 and 36 respectively.

In operation, for example, the circuit through connections 41 and 43 may be considered, when energized, as causing the motor to open the valve and admit steam under pressure to the retort while when the circuit through connections 41 and 44 is energized it will cause the motor to close the valve. In starting up, the pressure in the retort being low, the spring tube 2 will be contracted causing the pointer switch member 17 to be moved strongly to the left as viewed in Fig. 1 whereby the contacts 29 and 27 are in engagement and the circuit is completed through the connections 43, 40, coil 37, connection 38, spring finger 25, contacts 27, 29, switch pointer 17, hair spring 19, post 18 to connection 41. This causes the motor to open the valve and steam will be admitted to the retort until a certain pressure is reached when the spring tube 2, constantly expanded under the increasing pressure, will finally cause the switch pointer 17 to move to the right as viewed in Fig. 1 sufficiently to disengage contacts 27 and 29, thereby deenergizing the motor but leaving the valve in its open position. If the pressure, however, increases somewhat the contact 30 will be brought into engagement with contact 28 and close the circuit through the connections 41 and 44 so as to operate the motor to gradually close the valve. The motor will operate to close the valve until the pressure is reduced to the desired predetermined value when the connection between contacts 30 and 28 will become broken and the motor deenergized.

By turning the screw head 6 and thereby the stud 5, and insulating body 7, the upright thermostatic member 22 carrying the insulating block 24 and contacts 27 and 28 may be swung to the right or to the left as viewed in Fig. 1, with respect to the scale 31, so that the pressure which the apparatus will maintain constant in the retort may be manually adjusted without affecting and independently of the operation of the automatic adjustment produced by the thermostatic action hereinafter described and the pressure which the apparatus will maintain substantially constant will be substantially as indicated by the pointer 34 on the scale, for as the switch pointer 17 moves materially to one side or the other of pointer 34, due to a variation in pressure from the predetermined value, connections will be made to cause the motor to operate the valve so as to bring the pressure back substantially to said predetermined value.

Under certain conditions, however, where the pressure in the retort or other condition is rapidly changing, the motor can not ordinarily operate the valve to prevent an excessive variation above or below the predetermined value for which the apparatus is set. Thus in the arrangement described, when starting up the pressure in the retort may be increasing so rapidly due to the wide open condition of the valve that a great excess of pressure will be produced in the retort before the motor, after the circuit through contacts 30 and 28 has been closed, can close the valve sufficiently to maintain the desired predetermined pressure. Therefore, as one embodiment of my improvements, I have shown the thermostatic member 22 surrounded by the electrical heating coil 37.

When the pressure is building up and contacts 27 and 29 are in engagement causing the valve to be open, current flows through the coil 37 thereby heating the thermostatic strip 22 causing the same to bend and the upper end thereof to be swung to the left as viewed in Fig. 1. This causes the block 24, pointer 34 and contacts 27 and 28 to be moved correspondingly to the left so that the contacts are automatically adjusted for a slightly lower predetermined value than that for which the apparatus is set and as the pressure in the retort builds up the connection between contacts 27 and 29 will be broken before the pressure in the retort has reached the desired value. This will deenergize the motor and also the coil 37 so that the thermostatic member will cool off and gradually cause the contacts 27 and 28 to move to the right as viewed in Fig. 1 and assume their normal position.

The valve, however, being open the pressure in the retort will continue to build up. If the pressure is building up rapidly the switch member 17 will cause contact 30 to engage contact 28 before the thermostatic member has cooled off and so start to close the valve slightly before the desired predetermined pressure has been reached. When however the thermostatic member has completely cooled off and the contacts 27 and 28 are brought to normal position the closing of the valve will be stopped by the disengagement of contacts 28 and 30 due to the pressure falling to the desired predetermined value for which the apparatus is set.

In starting up, and after the pressure has reached a value sufficient to break the connection between contacts 27 and 29 and make connection between contacts 28 and 30, if the receding movement of contact 28 due to the cooling off of the thermostat is faster than the advancing movement due to the still increasing pressure, the connection between contacts 28 and 30 will be broken and the valve will then remain stationary until the increasing pressure again causes contact 30 to engage contact 28 when the valve will be further closed until these contacts are again disengaged by the further cooling of the thermostat, or by the receding pressure. If the pressure be slowly dropping then a small increase in the opening of the valve will be sufficient to hold the pressure substantially constant and this will be accomplished by the contacts 27 and 29 on the low side becoming engaged so as to energize the motor to open the valve. As the valve gradually opens the current which is now flowing through coil 37 heats the thermostat causing the contact 27 to be moved to the left as viewed in Fig. 1, and so causing the circuit to be opened sooner than it otherwise would be, and thereby tending to prevent the motor operated valve from materially overshooting, the time required for the thermostat to cool providing time sufficient to cause the increase in pressure with the slight opening of the valve to become effective. In this way when the pressure difference to be compensated for is small, the valve will operate for short periods so that excessive movements thereof are prevented, while when the pressure difference is great the valve will operate continuously for longer periods but without materially exceeding the desired limit, thus enabling extremely close regulation to be obtained. Thus I have provided an apparatus in which contacts are temporarily automatically set for a different predetermined value responsive to certain conditions in the apparatus, and in the particular arrangement described it will be seen that by providing means whereby the contacts are automatically adjusted for a slightly lower value when the contacts on the low side are engaged, then if the pressure rises quickly, the contacts on the high side will engage before the thermostat has had time to cool so that the valve will begin to close some time before the desired predetermined pressure has been reached, and so tend to prevent the pressure from exceeding the desired value.

While I have described my improvements in great detail and with respect to one embodiment thereof, I do not desire to be limited to such details or embodiment since many changes and modifications may be made and the improvements embodied in widely different forms for the regulation of pressure, temperature and other conditions and for rapidly changing variations of various kinds. Thus, for example, in certain cases it may be desirable to connect the heating coil 37 in circuit with the contacts on the high side. Hence I desire to cover all modifications and forms coming within the language or scope of any one or more of the appended claims.

What I claim as new and desire to secure by Letters Patent is:

1. Regulating apparatus having two electrical contacts and a relatively movable contact adapted to engage either one or the other of the first mentioned contacts responsive to certain variations substantially above or below a predetermined value respectively, and means whereby the first mentioned contact on the low side is automatically temporarily set for a slightly lower value when the third contact is in engagement therewith.

2. Regulating apparatus having two electrical contacts and a relatively movable contact adapted to engage either one or the other of the first mentioned contacts responsive to certain variations substantially above or below a predetermined value respectively, and means whereby said first two mentioned contacts are automatically set for a lower value when the first mentioned contact on the low side is in engagement with the third contact.

3. Regulating apparatus having in combination, a movable switch member actuated by certain variations, two contacts adapted to be engaged thereby, one when said variations drop below a predetermined value and the other when said variations exceed substantially said predetermined value, and means whereby one of said contacts is automatically adjusted for a different value when contact is made therewith by the movable switch member.

4. Regulating apparatus having in combination, a movable switch member actuated by certain variations, two contacts adapted to be engaged thereby, one when said variations drop below a predetermined value and the other when said variations exceed substantially said predetermined value, and means whereby the contact on the low side is automatically adjusted for a lower value when the said contact is in contact with the switch member.

5. Regulating apparatus having in combination, a movable switch member actuated by certain variations, two contacts adapted to be engaged thereby, one when said variations drop below a predetermined value and the other when said variations exceed substantially said predetermined value, and means whereby both of said contacts are automatically set for a lower value when one of said contacts is in contact with said switch member.

6. Regulating apparatus having in combination, a movable switch member actuated by certain variations, two contacts adapted to be engaged thereby, one when said variations drop below a predetermined value and the other when said variations exceed substantially said predetermined value, and means whereby one of said contacts is automatically adjusted for a different value when contact is made therewith by the movable switch member, and means for manually adjusting the predetermined value for which said contacts are set independently of the operation of said last mentioned means.

7. Regulating apparatus having in combination, a movable switch member actuated by certain variations, two contacts adapted to be engaged thereby, one when said variations drop below a predetermined value and the other when said variations exceed substantially said predetermined value, and means whereby the contact on the low side is automatically adjusted for a lower value when the said contact is in contact with the switch member, and means for manually adjusting the predetermined value for which said contacts are set without affecting the operation of said last mentioned means.

8. Regulating apparatus having in combination, a movable switch member actuated by certain variations, two contacts adapted to be engaged thereby, one when said variations drop below a predetermined value and the other when said variations exceed substantially said predetermined value, and means whereby one of said contacts is automatically adjusted for a different value when contact is made therewith by the movable switch member, said last mentioned means comprising a thermostatic member carrying said automatically adjustable contact and adapted to move the same when heated and a coil for heating the same, said coil being energized when the switch member is in contact with said automatically adjustable contact.

9. Regulating apparatus having in combination, a movable switch member actuated by certain variations, two contacts adapted to be engaged thereby, one when said variations drop below a predetermined value and the other when said variations exceed substantially said predetermined value, and means whereby the contact on the low side is automatically adjusted for a lower value when the said contact is in contact with the switch member, said last mentioned means comprising a thermostatic member carrying said automatically adjustable contact and adapted to move the same when heated and a coil for heating the same, said coil being energized when the switch member is in contact with said automatically adjustable contact, and means for manually adjusting the predetermined value for which said contacts are set without affecting the operation of said last mentioned means.

10. Regulating apparatus having in combination, a member movable by variations in pressure, a switch member operated thereby responsive to said variations in pressure, two contacts one on either side of said switch member and adapted to be engaged thereby, one when the variations in pressure drop below a predetermined value and the other when said variations in pressure substantially exceed said predetermined value, and means whereby one of said contacts is automatically adjusted for a different value when contact is made therewith by the movable switch member.

11. Regulating apparatus having in combination a member movable by variations in pressure, a switch member operated thereby responsive to said variations in pressure, two contacts one on either side of said switch member and adapted to be engaged thereby, one when the variations in pressure drop below a predetermined value and the other when said variations in pressure substantially exceed said predetermined value, and means whereby one of said contacts is automatically adjusted for a different value when contact is made therewith by the movable switch member, said last mentioned means comprising a thermostatic member carrying said automatically adjustable contact and adapted to move the same when heated and a coil for heating the same, said coil being energized when the switch member is in contact with said automatically adjustable contact.

12. Regulating apparatus having in combination, a member movable by variations in pressure, a switch member operated thereby responsive to said variations in pressure, two contacts one on either side of said switch member and adapted to be engaged thereby, one when the variations in pressure drop below a predetermined value and the other when said variations in pressure substantially exceed said predetermined value, and means whereby the contact on the low side is automatically adjusted for a lower value when the said contact is in contact with the switch member.

13. Regulating apparatus having in combination, a member movable by variations in in pressure, a switch member operated thereby responsive to said variations in pressure, two contacts one on either side of said switch member and adapted to be engaged thereby, one when the variations in pressure drop below a predetermined value and the other when said variations in pressure substantially exceed said predetermined value, and means whereby the contact on the low side is automatically adjusted for a lower value when the said contact is in contact with the switch member, said last mentioned means comprising a thermostatic member carrying said automatically adjustable contact and adapted to move the same when heated and a coil for heating the same, said coil being energized when the switch member is in contact with said automatically adjustable contact.

14. Regulating apparatus having in combination, a member movable by variations in pressure, a switch member operated thereby responsive to said variations in pressure, two contacts one on either side of said switch member and adapted to be engaged thereby, one when the variations in pressure drop below a predetermined value and the other when said variations in pressure substantially exceed said predetermined value, and means whereby both of said contacts are automatically set for a lower value when the contact on the low side is in contact with said switch member.

15. Regulating apparatus having in combination, a member movable by variations in pressure, a switch member operated thereby responsive to said variations in pressure, two contacts one on either side of said switch member and adapted to be engaged thereby, one when the variations in pressure drop below a predetermined value and the other when said variations in pressure substantially exceed said predetermined value, and means whereby one of said contacts is automatically temporarily adjusted for a different value responsive to certain conditions of the apparatus.

16. Regulating apparatus having in combination a member movable by variations in pressure, an electrical contact operated thereby, an electrical contact adapted to cooperate with the first mentioned contact, a thermostatic member carrying one of said contacts, and means for heating said thermostatic member electrically to vary the position of the contact carried thereby with respect to the other contact.

17. Regulating apparatus having in combination a Bourdon tube, an electrical contact operated thereby, an electrical contact adapted to cooperate with the first named contact, a bi-metallic thermostatic member carrying one of said contacts, and an electrical heating coil surrounding said thermostatic member to heat the same and thereby vary the position of the contact carried thereby with respect to the other contact.

In testimony whereof I have signed my name to this specification.

EMIL A. ILEMAN.